FACSIMILE COPYING APPARATUS

Filed April 22, 1948 2 Sheets-Sheet 1

Russell G. Thompson
INVENTOR
Newton M. Perrins
BY Rolla N. Carter
ATTORNEYS

Russell G. Thompson
INVENTOR
BY Newton M. Perrins
Rolla N. Carter
ATTORNEYS

Patented Nov. 14, 1950

2,529,978

UNITED STATES PATENT OFFICE 2,529,978

FACSIMILE COPYING APPARATUS

Russell G. Thompson, Rochester, N. Y., assignor to Eastman Kodak Company, Rochester, N. Y., a corporation of New Jersey Application April 22, 1948, Serial No. 22,683

7 Claims. (Cl. 178—6.6)

This invention relates to facsimile apparatus and more particularly to such apparatus with which the recording may be made on a continuous strip of material.

In most copying operations it is of great economic importance to produce a copy in a minimum of time. In many operations it is highly desirable to record a copy which is in essence a montage of different originals or of different selected portions of an original.

It is an object of the invention to provide facsimile apparatus which will record on a continuous sheet at a much higher speed than heretofore.

Another object of the invention is to provide facsimile apparatus which will collocate into a single picture a number of different signals representing different portions of an original or originals.

Another object of the invention is to provide facsimile apparatus which will record simultaneously several areas on the copy material whereby the speed of copying is increased.

Other objects of the invention will become apparent from the following description when read in connection with the accompanying drawing, in which Fig. 1 is a partial view of a facsimile apparatus having pickup and recording devices according to the invention;

Figures 1, 2, 3:
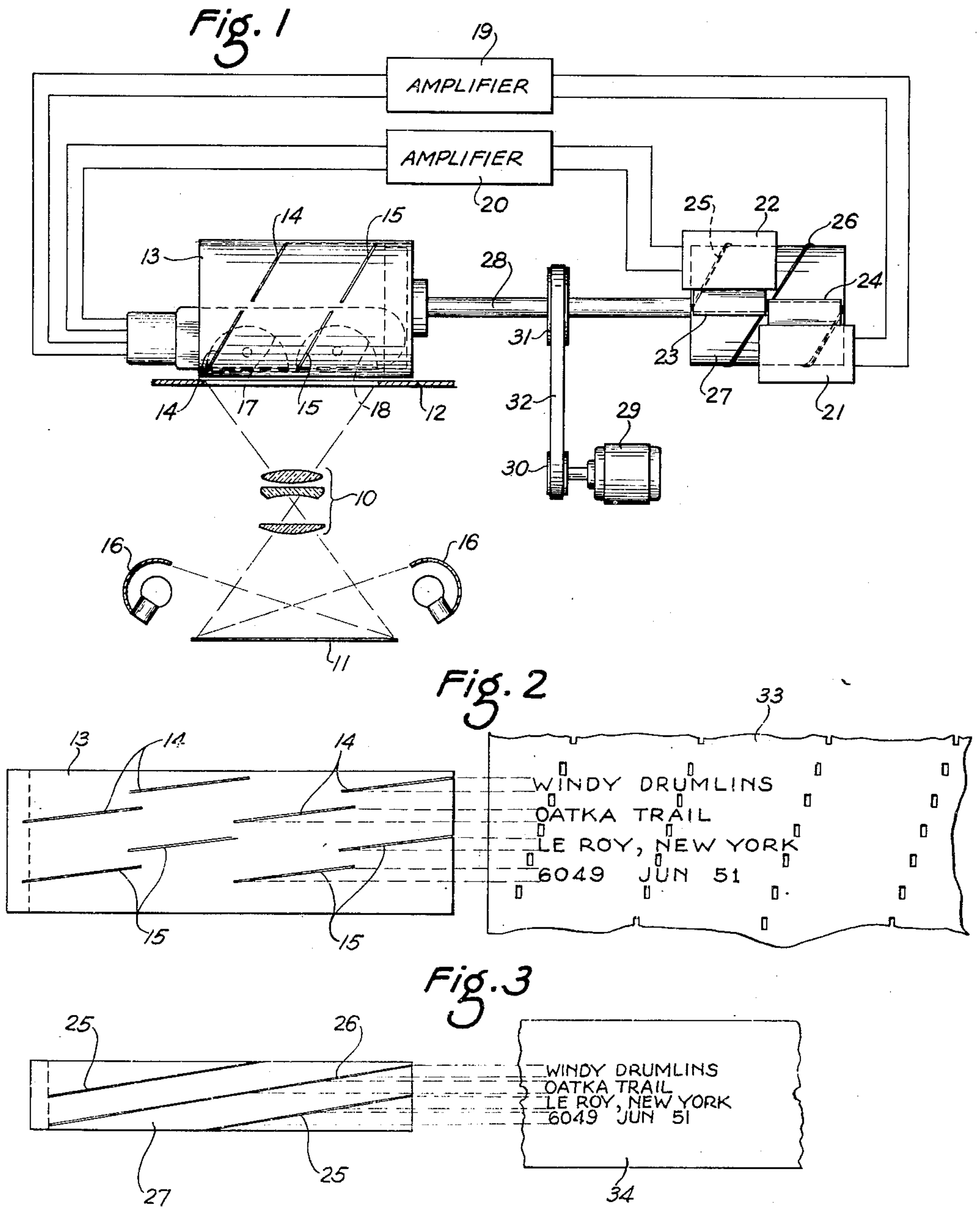
Figs. 2 and 3 are views showing, respectively, the development of the pickup and recording scanning drums of Fig. 1 and their relations to the matter being copied.

The apparatus illustrated for the purpose of describing the invention is of the same general type as that disclosed in my applications Serial Numbers 795,073, filed December 31, 1947, now abandoned, and 3,435, filed January 21, 1948, now Patent No. 2,510,200, granted June 6, 1950, and includes a lens 10 for imaging a document 11, such as a card, to be copied on an aperture plate 12 behind which is a rotatable drum 13 provided with helical scanning slits 14 and 15. The document 11 may be illuminated by lamps 16. Two light sensitive devices or cells 17 and 18 are arranged to respond to light transmitted by the scanning slits 14 and 15, respectively. As will be explained more fully in connection with Fig. 2, the scanning slits 14 and 15 simultaneously scan two separate portions of the document 11 and thus the cells 17 and 18 derive independent signals which, after amplification by amplifiers 19 and 20, are fed to independently actuatable printing members 21 and 22 which are here shown as being electromagnetic drivers for printing bars 23 and 24 which cooperate in a well-known manner with helical ridges 25 and 26 to provide a printing head or recording device for carbon paper recording. The helical ridges 25 and 26 are carried on a drum 27 mounted on a shaft 28 which may be driven by a motor 29 through pulleys 30 and 31 and a belt 32. Preferably, the pickup scanning drum 13 is also mounted on and rotates with the shaft 28. In the interest of clarity, no recording tape and carbon paper are shown between the ridges 25 and 26 and their printer bars 23 and 24.

A very useful application of the apparatus of the invention is the making of address labels from addresses carried on cards used in connection with tabulating devices and other business machines. By reference to Figs. 2 and 3, the relationships between the pickup scanning drum 13 and a card 33 to be copied and between the recording drum 27 and the address label 34 printed thereby will be evident. The two scanning drums 13 and 27 are shown in development. Although not forming a part of the present invention, the slits 14 and 15 in the drum 13 are preferably segmented and displaced axially on the drum 13 so as to eliminate scanning of the perforated spaces between the printed lines on the card 33 as fully described and claimed in application Serial Number 3,427, filed January 21, 1948, by Clayton E. Hunt, Jr. In Fig. 2 it will be noted that the helical segments 14 will scan the upper two lines of printed matter on the card 33 and the segments 14 will scan the two lower lines. Thus, in accordance with the invention, independent signals representing the upper two lines and the lower two lines will be derived simultaneously. Also, in accordance with the invention, the two helices 26 and 25 will simultaneously scan the upper and lower sections of the tape 34 upon which the address is printed. Since the limiting factor in the speed of copying is usually determined by the rate at which the printing bars can respond to signals and produce legible copy, it will be apparent that the multiple printing bars provided by the invention makes possible much higher copying speeds.

Figure 4:
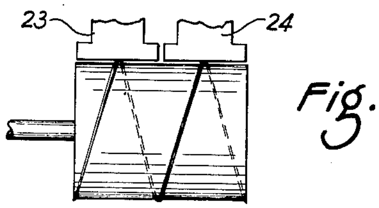
Figs. 4 and 5 are views showing alternative forms the spiral ridges on the recording drum may take.
Figure 5:
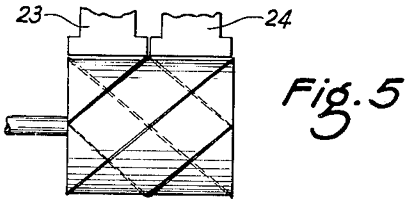
Figure 6:
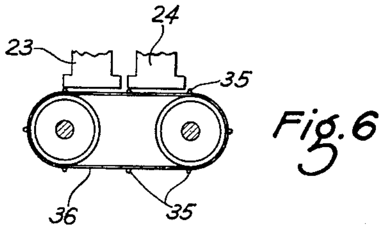
Fig. 6 shows a recording device according to the invention employing styli on an endless belt.
Figure 7:
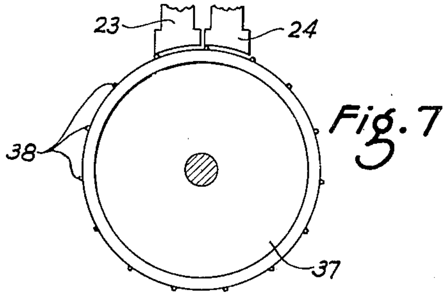
Fig. 7 shows the invention as embodied in a recorder employing scanning styli of the gear teeth type.
Figure 8:
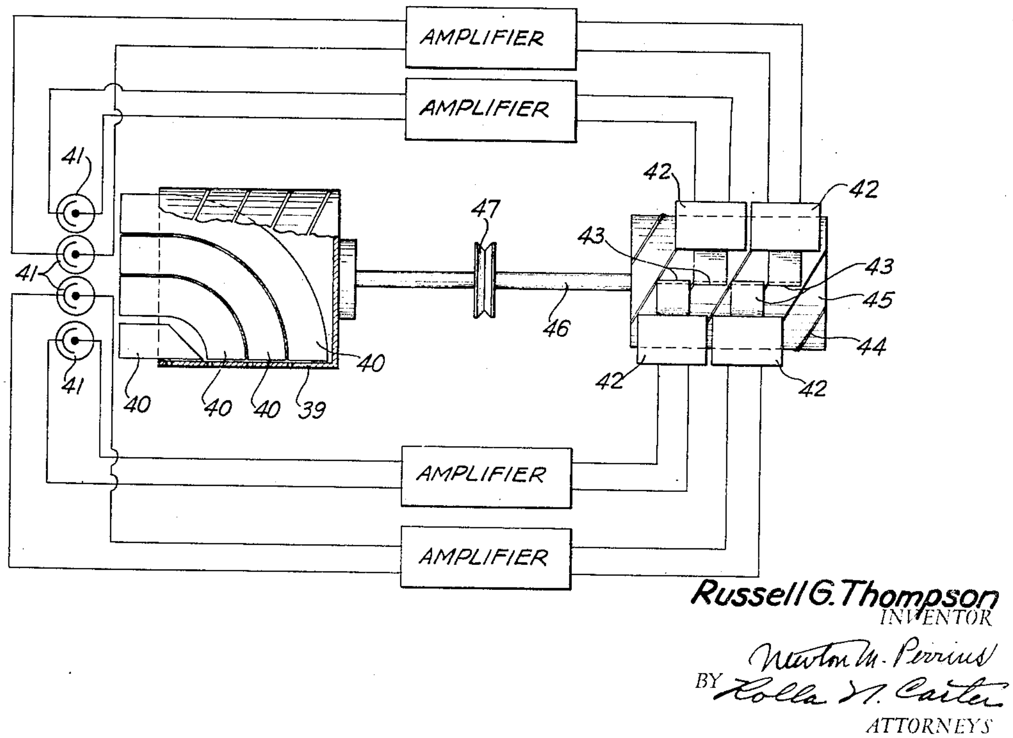
Fig. 8 is a partial view partly in section of a facsimile apparatus for simultaneously deriving and recording four independent signals.

Instead of using two spiral ridges for printing anvils as shown in Fig. 1, various other arrangements are available such as a single spiral for each printing bar, Fig. 4, or any number of ridges as long as one and only one ridge intersects with the edge of each printing bar as shown in Figs. 5 and 8. Also, the printing bars 23 and 24 may, according to the invention, have for their printing anvils styli 35 mounted on an endless carrier 36 as shown in Fig. 6, or, if desired, a rotatable disc 37, see Fig. 7, may be employed having styli 38 for scanning the printing edges of the bars 23 and 24. In each of the arrangements of Figs. 6 and 7 the styli 35 and 38, respectively, are spaced by a distance equal to the length of edges of the printing bars 23 and 24 so that both the bars 23 and 24 are simultaneously and similarly scanned.

As described thus far, only two printer bars have been employed but it will be obvious that the invention contemplates the use of a greater number of printing bars. An arrangement utilizing four printing bars is shown in Fig. 8 as employed for copying four lines of printed matter. In this arrangement, as specifically adapted for copying addresses from punched cards, a pickup scanning drum 39 is adapted to scan simultaneously each of the four lines on a card such as card 33 in Fig. 2 and to derive four independent signals therefrom through the agency of light conducting rods 40 and light-sensitive cells 41. These signals are amplified and delivered to four electromagnetic drivers 42 which actuate printing bars 43 arranged in alignment for cooperation with printing anvils 44 in the form of helical ridges on a drum 45. The two scanning drums 39 and 45 may be mounted on a single shaft 46 provided with a pulley 47.

Although the pickup and recording scanning drums have been disclosed as being mounted on the same shaft, it will be understood that they may be mounted on widely separated shafts and may even be rotated at different speeds predetermined by the pitch angles of the two scanning means, e. g., use of the recording drum of Fig. 4 with the pickup scanning drum 13 of Fig. 1 would require the recording drum to rotate at twice the angular speed of the drum 13. Conversely, the recording drum of Fig. 5 would rotate at one half the speed of the drum 13, the requirement being that for each scanning operation in the pickup a corresponding scanning action occurs in recording.

For the purpose of describing the invention, an apparatus for preparing address labels from punched business cards has been disclosed, the areas between the lines on the cards being neither scanned nor reproduced and separate areas being simultaneously scanned and reproduced. The separate areas need not appear on the same original and indeed need not be in the same building as long as synchronism is maintained. While a carbon paper recorder has been described in particular, it will be obvious that any method of recording in which linear printer elements or electrodes cooperating with movable scanning means may be used is contemplated by the present invention.

The invention is not limited to the particular embodiments disclosed but is of the scope of the appended claims.

I claim:

1. In facsimile apparatus, scanning means for simultaneously deriving separate signals corresponding to the optical values of sequential segments of a line traversing a picture to be reproduced, a recording device including a plurality of independently and simultaneously actuatable printing bars having their printing edges in alignment, individual means responsive, respectively, to the independent signals for actuating said printing bars, and a scanner for cooperating with all of said printing bars simultaneously, whereby separate portions of the picture to be reproduced will simultaneously be synthesized on a single record sheet moving between said printer bars and the scanner.

2. Apparatus in accordance with claim 1 and wherein the scanning means for the printing bars comprises an endless carrier provided with a plurality of styli spaced thereon by a distance equal to the length of a printing bar.

3. Apparatus in accordance with claim 1 and wherein the scanning means for the printing bars comprises a cylindrical drum rotatable about an axis parallel to the printing edges of said bars and having spiral ridges so arranged that at all times one and only one ridge intersects with the edge of each printing bar.

4. Apparatus in accordance with claim 3 wherein the rotatable cylindrical drum is provided with a 360 degree spiral ridge for each printing bar.

5. In facsimile apparatus, a recording device comprising a rotatable scanner having a plurality of styli uniformly spaced around a circle centered on the center of rotation of the scanner, at least two independently actuatable printing bars arranged to cooperate with the styli and to subtend adjacent angles at the center of rotation of the scanner equal to each other and to the angle subtended by any two adjacent styli, and an independent actuating means for each printing bar.

6. In facsimile apparatus, a collocating recording device for separate signals representing components of the picture to be recorded comprising at least two printing bars having arcuate printing edges of equal curvature and length arranged to conform to a single arc, a rotatable member carrying a plurality of styli equally spaced on a circle having a curvature equal to that of said arc and positioned to cooperate with said printing edges to form a scanning device, the spacing of said styli being equal to the length of one printing edge, and separate means for actuating each printing bar in accordance with a separate signal.

7. In facsimile apparatus, multiple scanning means for deriving a plurality of independent signals representative, respectively, of a plurality of selected object areas desired for collocation into a single picture, and a recording device comprising a scanner, a plurality of independently actuatable printing bars having their printing edges aligned in the direction of scanning, said scanner being so constructed that all of said bars are simultaneously scanned, and means for actuating each printing bar in response to a separate independent signal for simultaneously recording said signals on different areas of a single record sheet.

RUSSELL G. THOMPSON.

REFERENCES CITED

The following references are of record in the file of this patent:

UNITED STATES PATENTS

| Number | Name | Date |
|---|---|---|
| 1,775,241 | Horton | Sept. 9, 1930 |
| 2,104,109 | Young | Jan. 4, 1932 |
| 2,380,482 | Tribble | July 31, 1945 |